(12) United States Patent
Sato et al.

(10) Patent No.: US 8,164,027 B2
(45) Date of Patent: Apr. 24, 2012

(54) LASER PROCESSING SYSTEM AND LASER PROCESSING METHOD

(75) Inventors: Akio Sato, Toyota (JP); Hiroyuki Suzuki, Okazaki (JP); Akihiko Tsuboi, Chiryu (JP)

(73) Assignees: Toyota Jidosha Kabushiki Kaisha, Toyota-shi (JP); Laserx Co., Ltd., Chiryu-shi (JP)

( * ) Notice: Subject to any disclaimer, the term of this patent is extended or adjusted under 35 U.S.C. 154(b) by 1079 days.

(21) Appl. No.: 11/991,781

(22) PCT Filed: Jul. 10, 2007

(86) PCT No.: PCT/JP2007/064044
§ 371 (c)(1),
(2), (4) Date: Mar. 11, 2008

(87) PCT Pub. No.: WO2008/010469
PCT Pub. Date: Jan. 24, 2008

(65) Prior Publication Data
US 2010/0219171 A1    Sep. 2, 2010

(30) Foreign Application Priority Data
Jul. 19, 2006 (JP) .................................. 2006-196862

(51) Int. Cl.
*B23K 26/06* (2006.01)
(52) U.S. Cl. .......... 219/121.75; 219/121.78; 219/121.83
(58) Field of Classification Search ............. 219/121.75, 219/121.78, 121.73, 121.83, 121.82, 121.85
See application file for complete search history.

(56) References Cited

U.S. PATENT DOCUMENTS 5,011,282 A * 4/1991 Ream et al. .................... 356/153
6,163,012 A * 12/2000 Kimura et al. ........... 219/121.78
(Continued)

FOREIGN PATENT DOCUMENTS

DE    198 52 302 A1    5/2000
(Continued)

OTHER PUBLICATIONS

European Patent Office; Communication and Supplementary Search Report mailed Jun. 10, 2011 in related European Application No. 07768421.5.

(Continued)

*Primary Examiner* — M. Alexandra Elve
(74) *Attorney, Agent, or Firm* — Kenyon & Kenyon LLP

(57) ABSTRACT

A laser processing system and a laser processing method that can highly accurately and efficiently specify a focus position of a processing laser using visible lasers are provided. For that purpose, a laser processing system includes a processing laser oscillator, a condensing optical system including a condenser lens, two visible laser oscillators and, a movement adjusting unit that adjusts the condenser lens and the visible laser oscillators and to move forward and backward in synchronization with each other, an imaging unit that images spot lights of the visible lasers on a workpiece, an image processing unit that subjects an imaged video to image processing and displays an image after the processing, a calculating unit that calculates, in a state in which the respective visible lasers are focused on a focus position of the processing laser, center of gravity positions of spot lights of the respective visible lasers formed on the surface of the workpiece according to the movement of the condenser lens and calculates a distance between centers of gravity, and a control unit that controls the movement adjusting unit such that the distance between centers of gravity is adjusted to zero or substantially zero.

5 Claims, 9 Drawing Sheets

U.S. PATENT DOCUMENTS

| | | | |
|---|---|---|---|
| 6,462,306 B1 * | 10/2002 | Kitai et al. | 219/121.77 |
| 6,720,567 B2 * | 4/2004 | Fordahl et al. | 250/559.29 |
| 6,791,057 B1 | 9/2004 | Kratzsch et al. | |
| 7,638,731 B2 * | 12/2009 | Kosmowski | 219/121.68 |
| 7,902,483 B2 * | 3/2011 | Eiterer et al. | 219/121.7 |

FOREIGN PATENT DOCUMENTS

| | | |
|---|---|---|
| JP | 63-108981 A | 5/1988 |
| JP | 8-118055 | 5/1996 |
| JP | 8-304694 A | 11/1996 |
| JP | 9-216087 | 8/1997 |
| JP | 10-058169 | 3/1998 |
| JP | P3060779 | 4/2000 |
| JP | P 3352373 | 9/2002 |
| JP | 2003-029130 A | 1/2003 |
| JP | 2005-131668 A | 5/2005 |
| JP | 2005-316071 A | 11/2005 |
| JP | 2005-334972 A | 12/2005 |
| JP | 2007-237200 A | 9/2007 |
| WO | WO 2005044505 A1 * | 5/2005 |

OTHER PUBLICATIONS

Toshiyuki Tanaka, et al.: "Pickup for MD Player and Recorded", Sharp Technical Journal, Dec. 31, 1998, No. 72, pp. 38-41.

* cited by examiner

LASER PROCESSING SYSTEM AND LASER PROCESSING METHOD

This is a 371 national phase application of PCT/JP2007/064044 filed 10 Jul. 2007, claiming priority to Japanese Patent Application No. 2006-196862 filed 19 Jul. 2006, the contents of which are incorporated herein by reference.

TECHNICAL FIELD

The present invention relates to a laser processing system and a laser processing method, and, more particularly to a laser processing system and a laser processing method that can highly accurately and efficiently specify a focus position of a processing laser using a visible laser.

BACKGROUND ART

In laser processing, there is a so-called remote welding method for condensing a laser beam in a distance from a laser oscillator to perform welding while using a condenser lens having a long focus. A processing laser condensed by the condenser lens having a long focus can perform processing of a degree same as that of processing in a focus position even in a position slightly deviating from the focus position. In other words, since it is possible to secure long focal depth in a thickness direction of a workpiece, it is unnecessary to perform strict focus position management.

Incidentally, in order to condense the processing laser in a distance from the laser oscillator, a relatively high-quality laser oscillator is necessary. However, in the past, a laser oscillator that irradiates a carbon dioxide laser is mainly used. Since the carbon dioxide laser cannot be guided by an optical fiber, when it is attempted to condense the carbon gas laser in a distance like a welding area in a vehicle from the laser oscillator on the outside of the vehicle, a large number of mirrors have to be provided. Therefore, there is a problem in that it takes time to adjust the mirrors and cost increases. For the laser oscillator that irradiates a carbon dioxide laser, a technique for guiding the laser with an optical fiber has been developed. According to this technique, even when the laser is condensed in a distance like a welding area in a vehicle, it is possible to guide the laser using free flexibility of the optical fiber, it is unnecessary to adjust mirrors and the like, and, moreover, it is possible to reduce cost.

In a process of applying the remote welding method by a laser beam of this optical fiber light-guide type, it is becoming necessary to more strictly perform focus position management for the processing laser compared with the past. One of causes for this is considered to be that, in condensing an optical fiber light-guide type laser beam, since an optical system for focusing an emission fiber end face of the optical fiber is formed, beam shapes are different in a focus position and the periphery of the focus position.

In the laser processing, whichever of the carbon dioxide laser beam and the optical fiber light-guide type laser beam is applied, a focus position of the processing laser cannot be visually recognized. Therefore, in the present situation, visually recognizable focus positions of plural visible lasers are caused to coincide with the focus position of the processing laser in advance, the focus position of the processing laser is simulated by visually focusing the respective visible lasers, and laser processing is performed.

In order to improve visual focusing operation of the visible lasers, a technique for a teaching method and apparatus in a laser beam machine for irradiating one auxiliary laser beam (visible laser) and a main laser beam for processing on a work through an identical condenser lens and setting a point where both the laser beams coincide with each other as a focus position is disclosed in Patent Document 1. Moreover, a technique for a laser processing apparatus and a distance adjusting method for performing adjustment of a separation between a print surface of a work and a laser beam (print light) on the basis of an indication image formed by an intersection of two visible lights is disclosed in Patent Document 2.

Patent Document 1
JP Patent Publication (Kokai) No. 10-58169 A
Patent Document 2
JP Patent Publication (Kokai) No. 2005-131668 A

DISCLOSURE OF THE INVENTION

According to the teaching method and apparatus in the laser beam machine disclosed in Patent Document 1 described above, it is possible to accurately focus the main laser beam on the surface of the work compared with the technique in the past for visually focusing the visible lasers. However, with the method of judging possibility of focusing only from a positional relation between one auxiliary laser beam (visible laser) and the main laser beam for processing, it is impossible to cope with laser processing in which high focusing accuracy is required.

According to the laser processing apparatus and the distance adjusting method disclosed in Patent Document 2 described above, it is possible to irradiate a laser beam with desired energy density on a work. Here, in order to specify whether the laser beam and the visible lights are focused on the same irradiation position, a worker performs adjustment of an indication image by visible light when necessary and performs distance adjustment between the laser beam and the work while imaging the work surface and checking the work surface on a screen of a display unit. Therefore, the distance adjustment between the laser beam and the work is eventually no better than distance adjustment that depends on physical functions of the worker who visually recognizes the screen. It is still difficult to highly accurately perform position adjustment for the laser beam and the work.

The present invention has been devised in view of the problems and it is an object of the present invention to provide a laser processing system and a laser processing method that can extremely highly accurately and efficiently specify a focus position of a processing laser using visible lasers without depending on physical functions.

In order to attain the object, a laser processing system according to the present invention is a laser processing system that irradiates a laser beam on the surface of a workpiece to perform laser processing, the laser processing system including a processing laser oscillator, a condensing optical system including a condenser lens, two or more visible laser oscillators, movement adjusting means for adjusting the condenser lens and the visible laser oscillators to move forward and backward in synchronization with each other, imaging means for imaging spot lights of visible lasers on the surface of the workpiece, and image processing means for subjecting an imaged video to image processing and displaying an image after the processing, characterized in that both a processing laser and the visible lasers are irradiated on the workpiece via the condenser lens and the laser processing system further includes calculating means for calculating, in a state in which the respective visible lasers are focused on a focus position of the processing laser, center of gravity positions of spot lights of the respective visible lasers formed on the surface of the workpiece according to the movement of the condenser lens and a distance between centers of gravity that is a distance between those center of gravity positions and control means for controlling the movement adjusting means such that the distance between centers of gravity is adjusted to zero or substantially zero.

The laser processing system according to the present invention is a system for subjecting an arbitrary workpiece to laser welding, laser drilling, laser marking, and the like by applying an appropriate laser thereto. As the processing laser applied here, besides a carbon dioxide laser, there are a YAG laser, a YAG-SHG laser, and the like.

The condensing optical system is constituted by disposing, for example, two or more condenser lenses, a collimate lens and a condenser lens, or the like at an appropriate space. In the laser processing system according to the present invention, the two or more visible laser oscillators are provided on a side opposite to the workpiece (the processing laser oscillator side) of a condenser lens closest to the workpiece. This condenser lens and the two or more visible laser oscillators are subjected to movement control by the movement adjusting means such that the condenser lens and the visible laser oscillators can move forward and backward by a predetermined movement amount in synchronization with each other. Both the processing laser and the visible lasers are irradiated on the workpiece via the condenser lens closest to the workpiece.

In using this laser processing system, by setting postures of the respective components such that the respective visible lasers are focused on the focus position of the processing laser, even if focusing positions of plural visible lasers change, it is possible to specify the focus position of the processing laser by specifying such focusing positions. Such initial setting is performed by setting the focus position of the processing lens in advance with a publicly-known focus monitor and performing separation of the condenser lens and the visible lasers and angle adjustment for the respective visible lasers such that the respective visible lasers are focused on the focus position of the processing laser.

The imaging means for imaging focus lights of the visible lasers on the surface of the workpiece is provided. A photographed video is subjected to screen display after being subjected to image processing by the image processing means. As this imaging means, for example, a CCD camera can be applied. The image processing means is constituted by, for example, a personal computer and connected to the CCD camera. This imaging means is provided, for example, on a rear end side of the condensing optical system, i.e., on the opposite side of the workpiece. Consequently, it is possible to image (spot lights) of visible lasers irradiated through the condensing leans and reflected on the surface of the work piece. In other words, a disposed position of this imaging means is set such that an imaging screen constituting the imaging means is orthogonal to an optical axis direction of reflected lights of the visible lasers from the workpiece.

The laser processing system according to the present invention further includes the calculating means for calculating center of gravity positions of spot lights of respective visible lasers formed on the surface of the workpiece according to the movement of the condenser lens and calculating a distance between centers of gravity and the control means for controlling the movement adjusting means such that the distance between centers of gravity is adjusted to zero or substantially zero. The calculating means and the control means are built in the personal computer together with, for example, the movement adjusting means described above. As this control means, a publicly-known CPU that performs execution control for the respective means can be applied. A shape of the spot lights assumes not only a circular shape but also arbitrary shape such as an elliptical shape when the surface of the workpiece is, for example, inclined. At a stage when the shape of the spot lights of the respective visible lasers are read by the imaging means, center of gravity positions of the respective spot lights are calculated by the calculating means. After the center of gravity positions of the respective spot lights are calculated, calculation of a distance between centers of gravity is also executed by the calculating means.

When the distance between centers of gravity is zero, the respective visible lasers are focused and this focusing point is already set in the focus position of the processing laser. Thus, it is specified that a present position of the condenser lens (and the visible laser oscillator) with respect to the workpiece is a position suitable for laser processing. It is also possible to set an arbitrary allowable error (target value) for the distance between centers of gravity and, when the distance between centers of gravity are within an allowable value range, shift to laser processing.

When the distance between centers of gravity is not zero and is not within the allowable range, the condenser lens and the visible laser oscillators are moved by a predetermined amount in synchronization with each other by the movement adjusting means in order to adjust the distance between centers of gravity to zero or substantially zero. Such movement amount control of the movement adjustment means is executed by the control means (e.g., a CPU) that is built in the computer and transmits a movement command signal to the movement adjusting means on the basis of data of the distance between centers of gravity from the calculating means. As already described, since the focus position of the processing laser and the focusing positions of the respective visible lasers are already adjusted to coincide with each other, it is possible to set a focus position (a focusing position) in a predetermined position on the surface of the workpiece by moving the condenser lens by the predetermined amount.

According to the verification of the inventors, it has been proved that it is possible to set a focus position of the processing laser on the surface of the workpiece at extremely high error accuracy smaller than, for example, 0.5 mm by specifying center of gravity positions of spot lights of such visible lasers and calculating a distance between centers of gravity and subjecting the condenser lens to movement control to adjust the distance between centers of gravity to zero or substantially zero. This is because, whatever posture the workpiece takes (e.g., the workpiece is inclined), deviation between the focus position of the processing laser and the surface of the workpiece in a present position of the condenser lens is objectively and quantitatively specified by calculating centers of gravity of plural spot lights formed on the surface of the workpiece. The distance between centers of gravity can be adjusted to zero simply by moving the condenser lens because the visible lasers pass the focusing point at a fixed angle and irradiated on the work piece and because, at a stage an angle of the visible laser oscillators and relative positions of the visible laser oscillators and the condenser lens are adjusted first, the distance between centers of gravity of the spot lights of the plural visible lasers are in a proportional relation according to a movement amount of the condenser lens. Therefore, in the laser processing system according to the present invention, it is possible to highly accurately set the focus position of the processing laser in a laser processing position and automatically and quickly execute such position setting. This leads to improvement of manufacturing yield.

A preferred embodiment of the laser processing system according to the present invention is characterized in that the two or more visible laser oscillators are controlled to be alternately turned on.

In specifying center of gravity positions of the spot lights of the respective visible lasers on the surface of the workpiece, a problem in that both the spot lights overlap and make it difficult to specify the center of gravity positions does not occur when the visible laser beams are separately irradiated to form spot lights and center of gravity positions of the respective spot lights are specified rather than when both the spot lights are irradiated at a time. Thus, the irradiation of the visible lasers of the respective visible laser oscillators are controlled to be alternately turned on and, after a center of gravity position of one spot light is specified, irradiation of the other spot light is performed and a center of gravity position of the other spot light is specified.

In the laser processing system according to the present invention, an embodiment in which the processing laser oscillator is controlled to be turned on at a stage when a distance between centers of gravity of the respective spot lights is adjusted to zero or substantially zero is preferable. For example, a distance between centers of gravity is calculated by the calculating means, the movement adjusting means operates on the basis of data of such a distance between centers of gravity to subject the condenser lens and the visible laser oscillators to movement adjust by a predetermined amount, and the processing laser oscillator is turned on at a stage when the condenser lens and the like move by the predetermined amount. Consequently, it is possible to accurately set a focus position of the processing laser on the surface of the workpiece.

In another embodiment of the laser processing system according to the present invention, the laser processing system is characterized in that an optical fiber that guides the processing laser beam is interposed between the processing laser oscillator and the condensing optical system and the laser processing system further includes a manipulator mounted with a unit including at least the condensing optical system and the imaging means.

This system is constituted by uniting the condensing optical system, the visible laser oscillators, and the imaging means constituted by the CCD camera or the like as one unit, connecting the processing laser oscillator and the unit with an optical fiber, irradiating the processing laser on the condensing optical system via the optical fiber, and, moreover, mounting the unit on a manipulator such as a multi joint robot arm or the like.

In the laser processing system according to the present invention, highly accurate laser processing is possible even in laser processing of an area in a vehicle that cannot be directly visually recognized, laser processing in a narrow and small processing space, laser processing for a processing area located in the depth of a product, and the like.

Moreover, a laser processing method according to the present invention is a laser processing method employing a laser processing system including a processing laser oscillator, a condensing optical system including a condenser lens, first and second visible laser oscillators, movement adjusting means for adjusting the condenser lens and the visible laser oscillators to move forward and backward in synchronization with each other, imaging means for imaging spot lights of visible lasers on the surface of a workpiece, and image processing means for subjecting an imaged video to image processing and displaying an image after the processing, the laser processing system being disposed such that both the processing laser and the visible lasers are irradiated on the workpiece via the condenser lens, the laser processing method characterized by including a first step of performing adjustment of an irradiation angle of the respective visible lasers and positioning adjustment for the condenser lens and the visible laser oscillators such that the respective visible lasers are focused on a focus position of the processing laser, a second step of turning on the first visible laser oscillator to image the spot light of the visible laser on the surface of the workpiece and calculating a center of gravity position of the spot light, a third step of turning on the second visible laser oscillator to image the spot light of the visible laser on the surface of the workpiece and calculating a center of gravity position of the spot light, a fourth step of calculating a distance between centers of gravity of both the spot lights, a fifth step of moving the condenser lens and the visible laser oscillators in synchronization with each other such that the distance between centers of gravity is adjusted to zero, and a sixth step of turning on the processing laser oscillator at a stage when the distance between centers of gravity is adjusted to zero.

The present invention relates to the laser processing method to which the laser processing system already described is applied. The laser processing system used here only has to include, as the visible laser oscillators, two oscillators (the first and second visible laser oscillators). However, the laser processing system may be a processing system including three or more visible laser oscillators.

First, as initial setting, adjustment of irradiation angles of the respective visible lasers and positioning adjustment for the condenser lens and the visible laser oscillators are performed such that the respective visible lasers are focused on the focus position of the processing laser (first step). As already described, the focus position of the processing laser and focusing positions of the respective visible lasers are caused to coincide with each other by this initial setting. Even if the condenser lens moves, the condenser lens can move in a state in which the focus position and the focusing positions coincide with each other.

In the second step and the third step, irradiation of the visible lasers from the respective visible laser oscillators and calculation of center of gravity positions of the spot lights are performed. A reason for performing laser irradiation for each of the visible laser oscillators is as already described.

Subsequently, calculation of a distance between centers of gravity is performed (the fourth step). When the distance between centers of gravity is not zero (or when the distance between centers of gravity is not within the allowable range), the condenser lens and the visible laser oscillators are moved by the predetermined amount in synchronization with each other on the basis of data of this distance between centers of gravity such that the distance between centers of gravity is adjusted to zero (the fifth step).

At a stage when the distance between centers of gravity is adjusted to zero, the processing laser oscillator is turned on and irradiation of the processing laser is executed, desired laser welding, laser drilling, laser marking, and the like are executed (the sixth step). A series of steps including the second step to the sixth step are repeatedly executed until the distance between centers of gravity satisfies a target value, whereby it is also possible to perform fine adjustment of a focus position corresponding to a small change in a position on the surface of the workpiece. Such repetition of a flow can be executed by incorporating a feedback control mechanism in the system.

In the laser processing method according to the present invention, a degree of coincidence of the focus position of the processing laser and the surface of the workpiece is specified by the distance between centers of gravity of the spot lights of the two visible lasers. Thus, regardless of a surface shape and a posture (inclination) of the workpiece, it is possible to extremely highly accurately and efficiently perform setting of the focus position. Therefore, in particular, even in remote welding in which setting of a focus position of a processing laser is extremely difficult, highly accurate and efficient setting of a focus position is realized. Thus, it is possible to simultaneously solve both the fall in processing accuracy and the fall in yield that are problems in such remote welding.

As it is understood from the above explanation, in the laser processing system and the laser processing method according to the present invention, respective center of gravity positions of the spot lights on the surface of the work piece formed by the plural visible lasers are calculated and irradiation of the processing laser is performed in a state in which a distance between centers of gravity is adjusted to zero or substantially zero. Therefore, it is possible to extremely highly accurately and efficiently perform laser processing.

BRIEF DESCRIPTION OF THE DRAWINGS

In FIG. 3, 3A is an arrow view taken along III-III in FIGS. 2 and 3B is a diagram in which the distance between centers of gravity is adjusted to zero;

Figure 1:
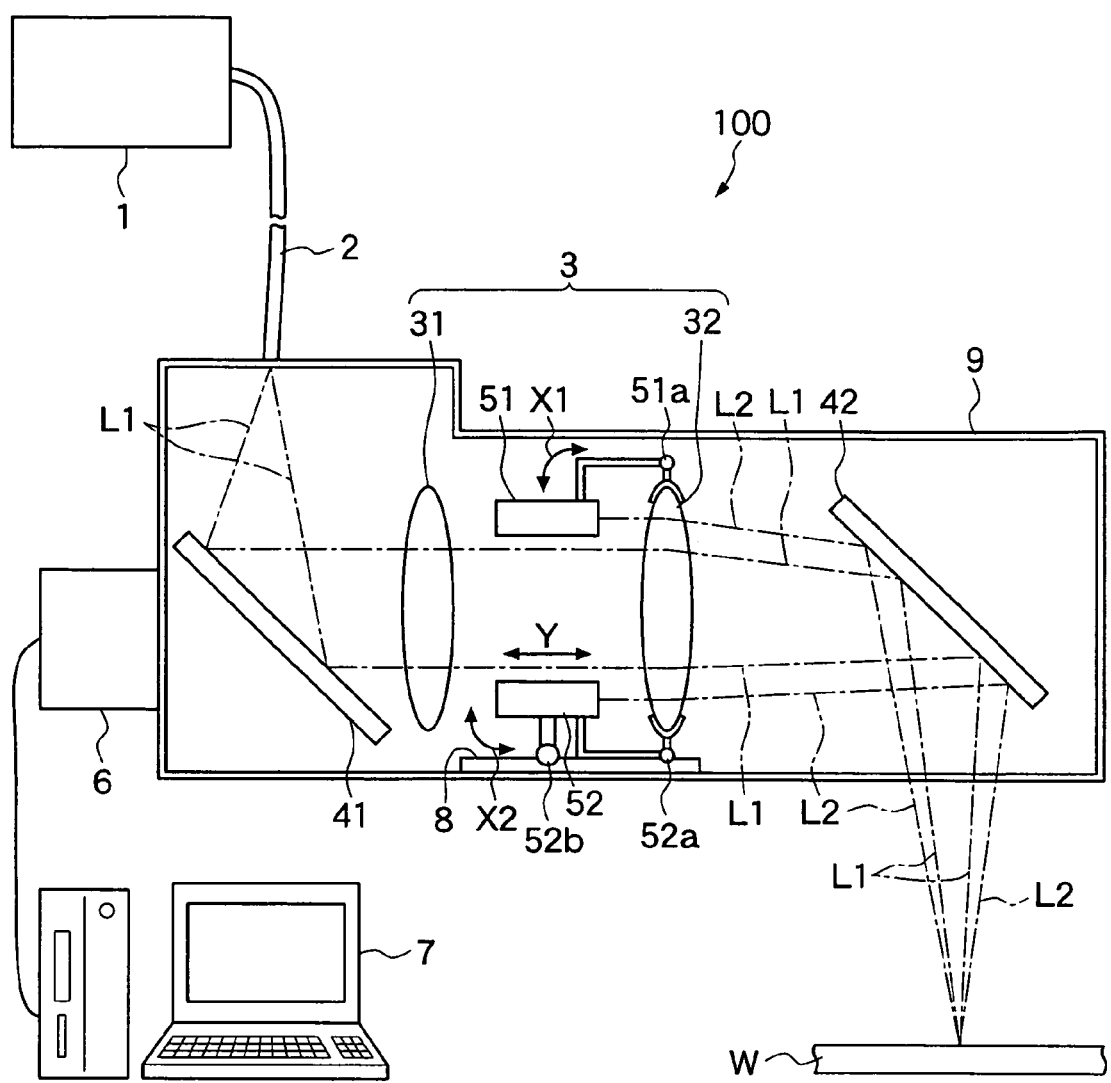
FIG. 1 is a schematic diagram of an embodiment of a laser processing system according to the present invention.

In the drawings, reference numeral 1 denotes a processing laser oscillator; 2, an optical fiber; 3 and 3a, condensing optical systems; 31, a collimate lens; 32, a condenser lens; 41 and 42, refractive lenses; 51, 52, 53, and 54, visible laser oscillators; 6, a CCD camera; 7, a personal computer; 8, a moving rail; 9, a housing; 10, a multi-joint robot arm; 100 and 100A, laser processing systems; W, a workpiece; L1, a processing laser; L2, a visible laser; S0, S1, S2, S0', S1', and S2', spot lights; and S1a, S2a, S1'a, and S2'a; centers of gravity.

BEST MODE FOR CARRYING OUT THE INVENTION

Figure 2:
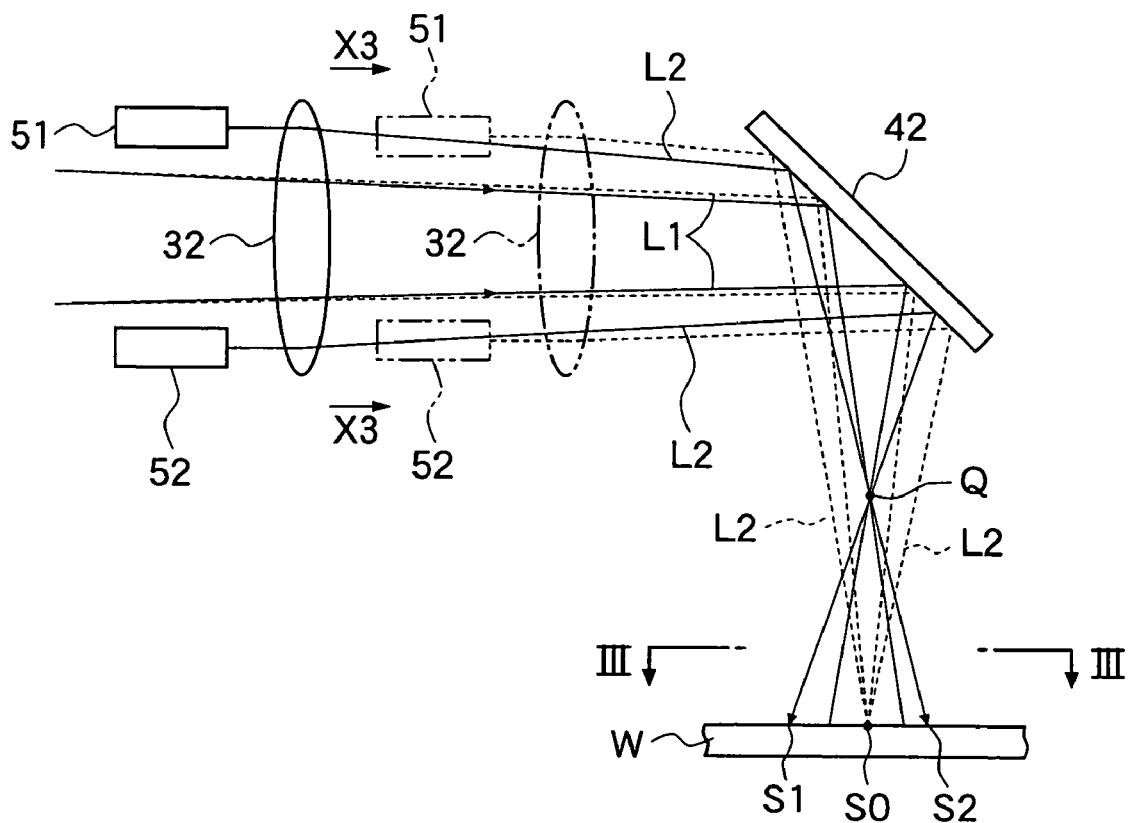
FIG. 2 is a schematic diagram for explaining a state in which a distance between centers of gravity of spot lights of two visible lasers is adjusted by moving a condenser lens.
Figure 3:
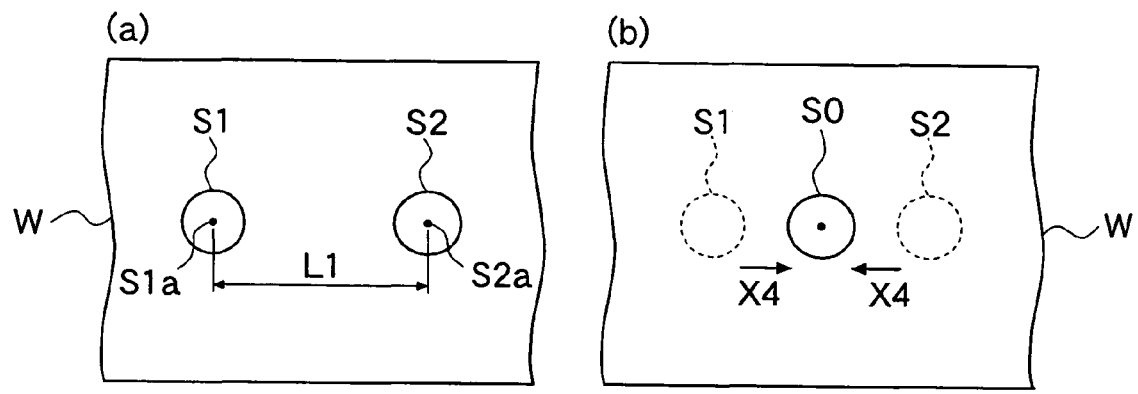
Figure 4:
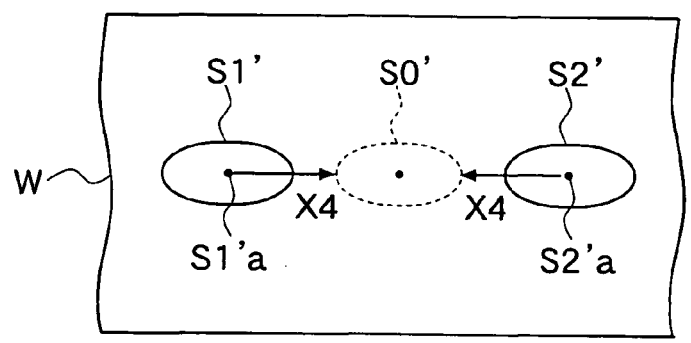
FIG. 4 is a schematic diagram showing spot light of an elliptical shape.
Figure 5:
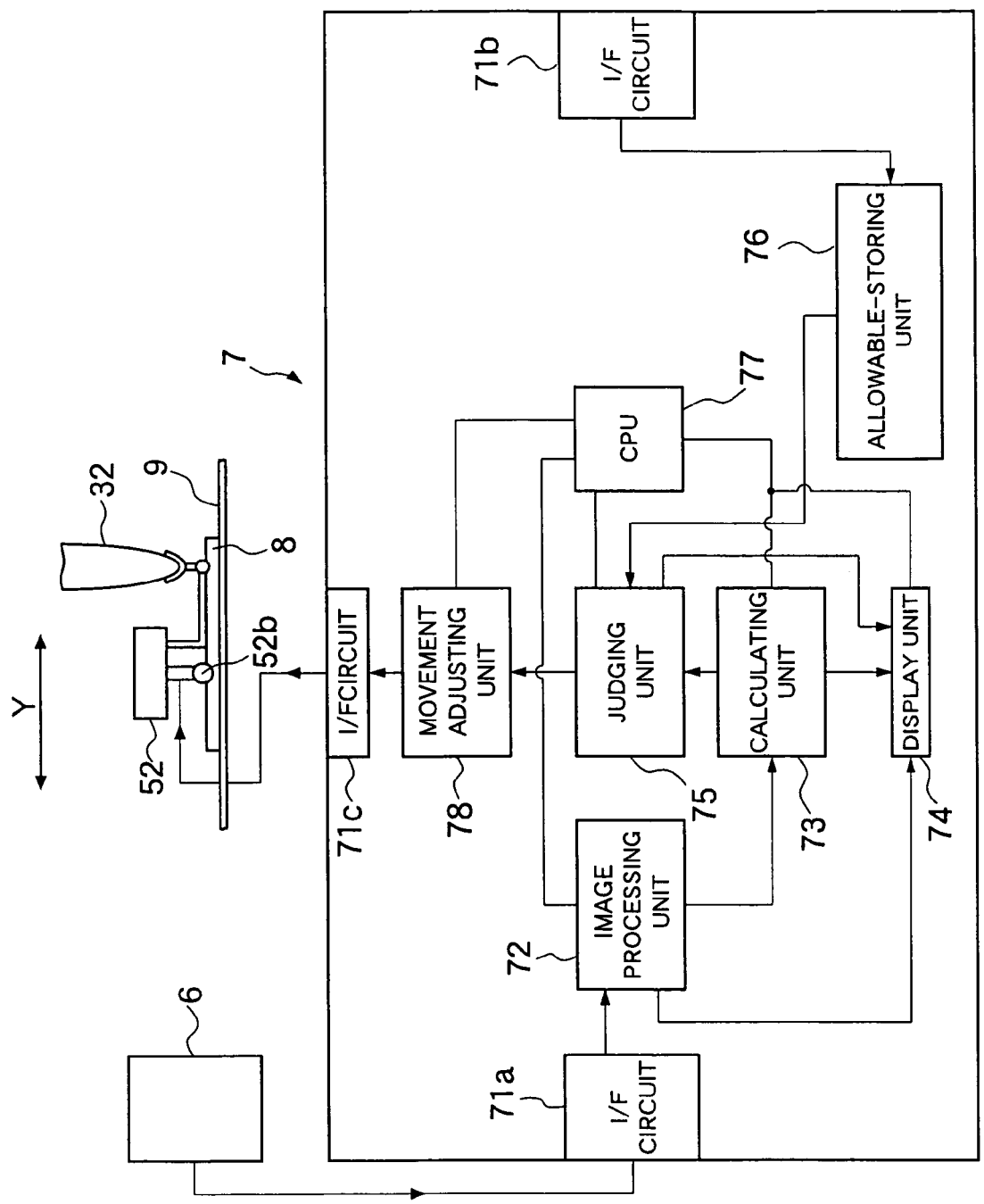
FIG. 5 is a block diagram of a control mechanism of the laser processing system.
Figure 6:
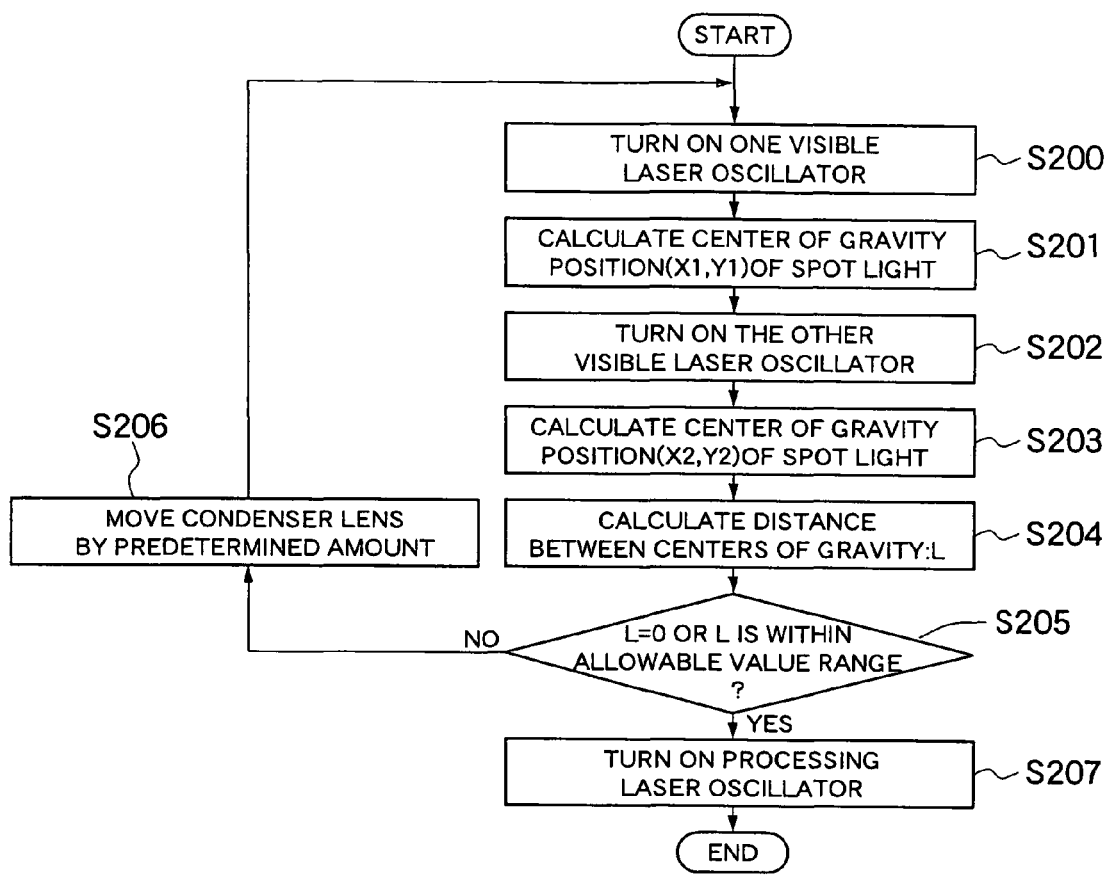
FIG. 6 is a diagram showing an embodiment of a control flow of the laser processing system.
Figure 7:
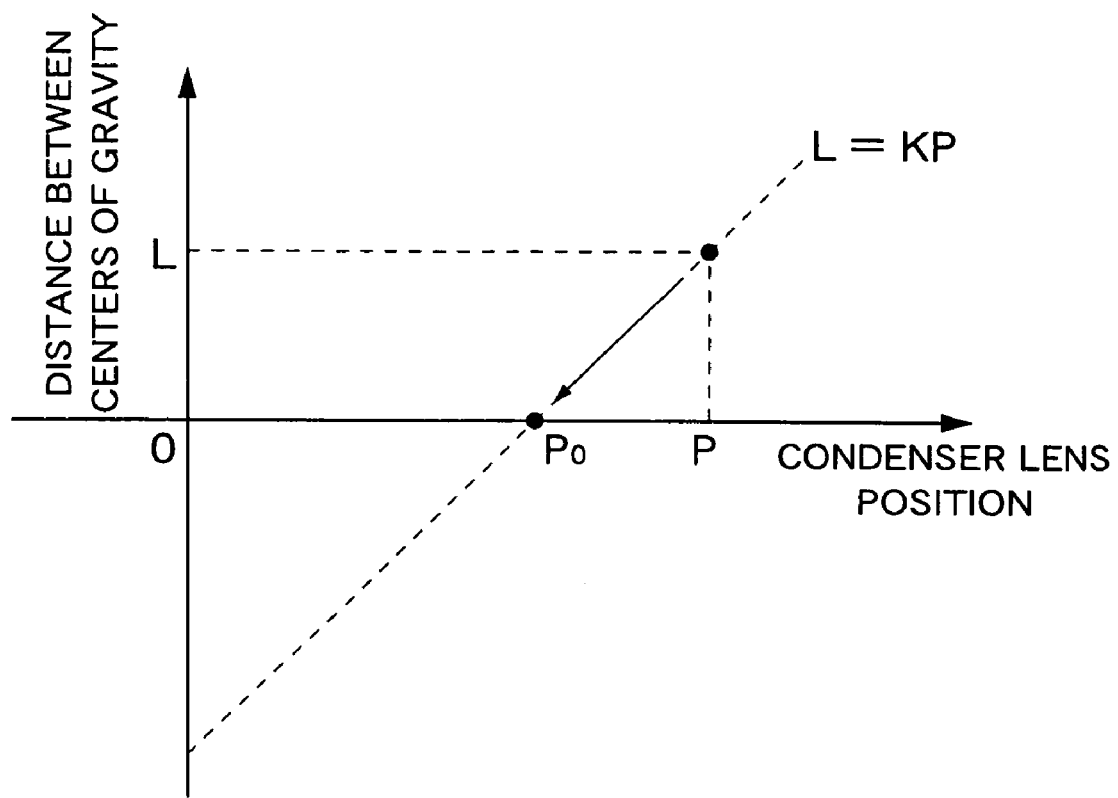
FIG. 7 is a graph for explaining a relation between a distance between centers of gravity and a condenser lens position.
Figure 8:
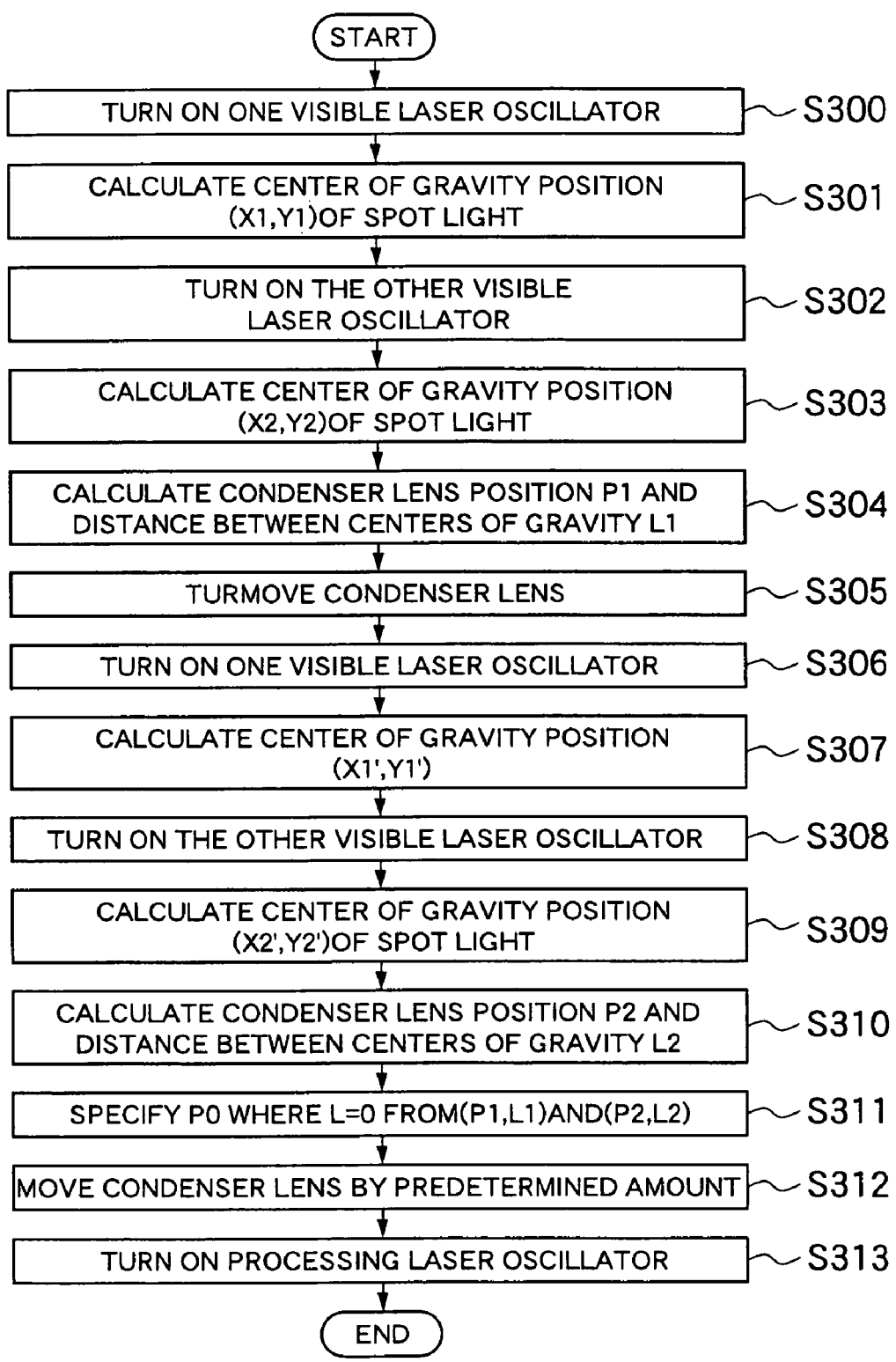
FIG. 8 is a diagram showing another embodiment of the control flow of the laser processing system.
Figure 9:
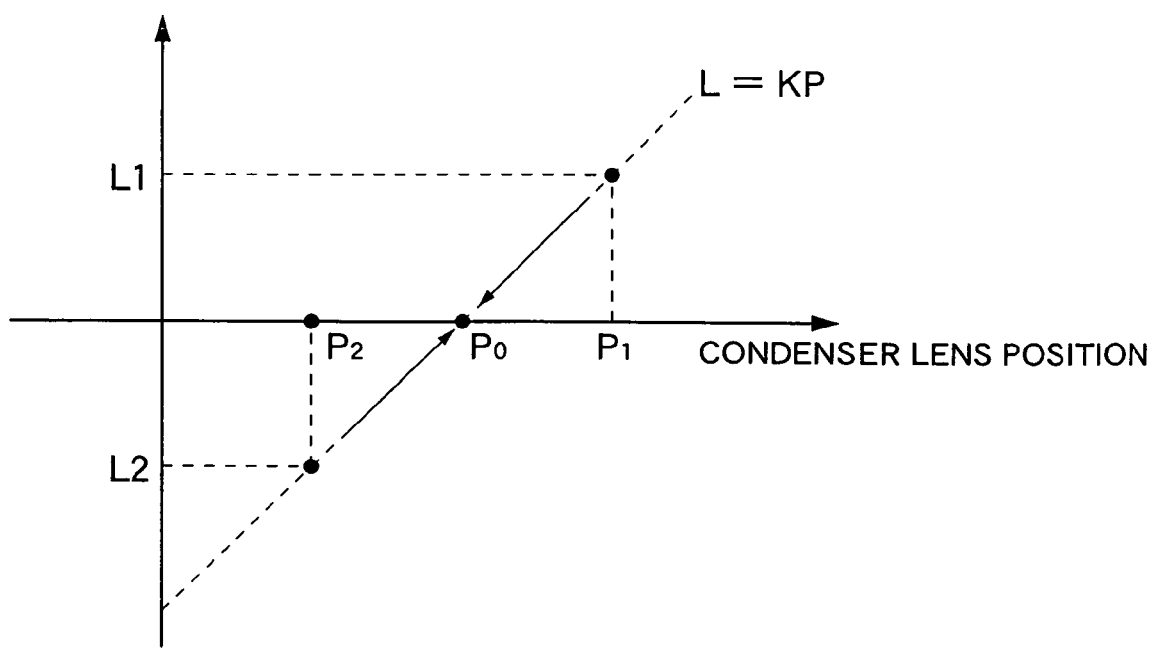
FIG. 9 is a graph for explaining a relation between a distance between centers of gravity and a condenser lens position.
Figure 10:
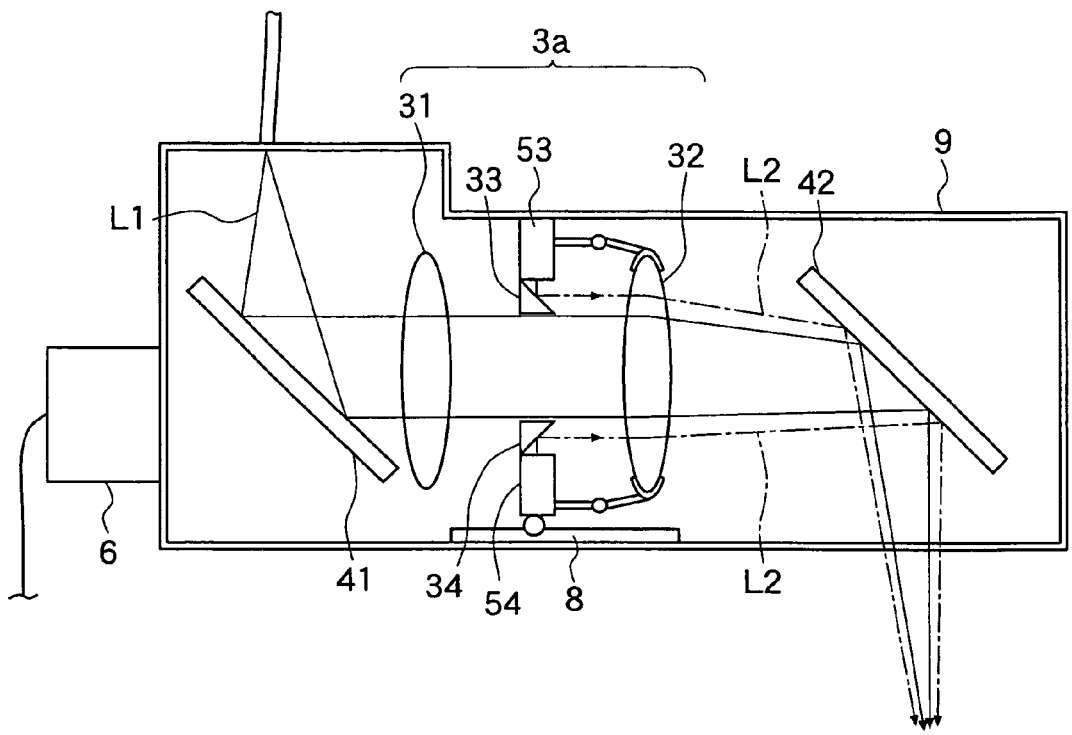
FIG. 10 is a schematic diagram of another embodiment of a condensing optical system.
Figure 11:
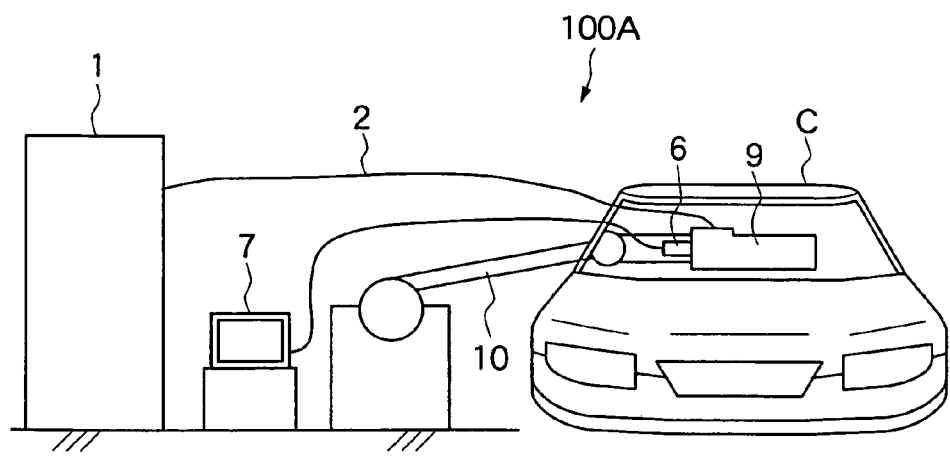
FIG. 11 is a schematic diagram of another embodiment of the laser processing system.

Embodiments of the present invention will be hereinafter explained with reference to the drawings. FIG. 1 shows a schematic diagram of an embodiment of a laser processing system according to the present invention, FIG. 2 shows a schematic diagram for explaining a state in which a distance between centers of gravity of spot lights of two visible lasers is adjusted by moving a condenser lens, FIG. 3A shows an arrow view taken along III-III in FIG. 2, and FIG. 3B shows a diagram in which the distance between centers of gravity is adjusted to zero. FIG. 4 shows a schematic diagram showing spot light of an elliptical shape, FIG. 5 shows a block diagram of a control mechanism of the laser processing system, FIG. 6 shows a diagram showing an embodiment of a control flow of the laser processing system, and FIG. 7 shows a graph for explaining a relation between a distance between centers of gravity and a condenser lens position. FIG. 8 shows a diagram showing another embodiment of the control flow of the laser processing system, FIG. 9 shows a graph for explaining a relation between a distance between centers of gravity and a condenser lens position, FIG. 10 shows a schematic diagram of another embodiment of a condensing optical system, and FIG. 11 shows a schematic diagram of another embodiment of the laser processing system.

FIG. 1 shows a schematic diagram of an embodiment of a laser processing system. A laser processing system 100 generally includes a processing laser oscillator 1 that irradiates a processing laser L1 such as a YAG laser or a YAG-SHG laser, an optical fiber 2 that guides the processing laser L1, a refractive lens 41 that refracts a laser beam irradiated from the optical fiber 2, a condensing optical system 3 that condenses the light refracted by the refractive lens 41, a refractive lens 42 that refracts the processing laser L1 condensed by the condensing optical system 3 to a workpiece side, visible laser oscillators 51 and 52 that oscillate a visible laser L2, a CCD camera 6, and a personal computer 7 that controls the system. The refractive lens 41, the condensing optical system 3, the visible laser oscillators 51 and 52, and the refractive lens 42 are housed in a housing 9. The optical fiber 2 and the CCD camera 6 are mounted in predetermined position of this housing.

The condensing optical system 3 includes a collimate lens 31 that changes the processing laser L1 refracted via the refractive lens 41 to parallel light and a condenser lens 32 that condenses the parallel light. On the collimate lens side of this condenser lens 32, the visible laser oscillators 51 and 52 are integrally mounted via the condenser lens 32 and hinges 51a and 52a. A wheel 52b mounted on a lower surface of the visible laser oscillator 52 is movable on a moving rail 8 (in a Y direction). The visible laser oscillators 51 and 52 are capable of adjusting an angle thereof with the hinges 51a and 52a (in an X1 direction and an X direction). Angle adjustment for the visible laser oscillator is performed such that focusing positions of the respective visible lasers L2 and L2 coincide with a focus position of the processing laser L1.

Videos of spot lights of the respective visible laser beams L2 and L2 formed on the surface of the workpiece W are photographed by the CCD camera 6 via the refractive lens 42. A photographed image is transmitted to the personal computer 7 and subjected to image processing in the personal computer 7. After the image processing, a distance between center of gravity positions (a distance between centers of gravity) of the spot lights of the respective visible lasers L2 and L2 is calculated in the computer (as described later).

FIG. 2 is a diagram schematically showing a coincidence point Q of the focus position of the processing laser L1 and the focusing positions of the visible lasers L2 and L2 set first, spot lights S1 and S2 of the two visible lasers formed on the surface of an arbitrary workpiece W, and spot light S0 at the time when a distance between centers of gravity of the spot lights is adjusted to zero.

In carrying out laser processing, in this system, first, in order to cause a focus position of a processing laser and focusing positions of respective visible lasers to coincide, a focus position of a processing lens is set in advance by a publicly-known focus monitor or the like, separation of a condenser lens and the visible lasers and angle adjustment for the respective visible lasers are performed such that the focusing positions of the respective visible lasers coincide with the focus position of the processing laser. The visible lasers L2 and L2 irradiated on the surface of the arbitrary workpiece W in a state of such initial setting are lasers indicated by solid lines in FIG. 2. The two circular spot lights S1 and S2 formed on the surface of the workpiece W by such visible lasers L2 and L2 are shown in a plan view in FIG. 3A.

Centers of gravity of the respective spot lights are S1a and S2a and a distance between centers of gravity thereof is L1. Here, as it is evident from FIG. 2, since a visible laser angle after refraction is unconditionally determined according to a position of the condenser lens 32, a distance between centers of gravity determined by such a laser angle and a distance to the workpiece is also unconditionally determined. By moving the position of the condenser lens 32 using such a relation (e.g., moved in an X3 direction to a position indicated by an alternate long and two dashes line in FIG. 2), it is possible to adjust the distance between centers of gravity to zero (both the spot lights move as shown in FIG. 3B (in an X4 direction) and spot light S0 whose distance between centers of gravity is zero is formed).

When the workpiece W has an arbitrarily inclined posture, spot light formed on the surface of the workpiece assumes an elliptical shape shown in FIG. 4. Although not shown in the figure, in some case, one spot light is elliptical and the other spot light is circular. In this way, even if a shape of the respective spot lights is an arbitrary shape, by calculating center of gravity positions of the respective spot lights and moving the condenser lens to adjust a distance between centers of gravity to zero or to be within an allowable range, it is possible to set a focus position of the processing laser on the surface of the workpiece regardless of a posture of the workpiece. FIG. 4 shows a state in which spot light S0' whose distance between centers of gravity is zero is formed by moving two elliptical spot lights S1' and S2' (centers of gravity S1'a and S2'a) in the X4 direction.

FIG. 5 shows a block diagram of a control mechanism of the laser processing system 100. A photographed image of spot light of a visible laser photographed by a photographing unit (the CCD camera 6) is transmitted to an I/F circuit 71a in the personal computer 7 and subjected to image processing by an image processing unit 72. An image after the image processing is displayed on a display unit 74 in forms shown in FIGS. 3A and 3B. On the other hand, data concerning an initial setting value (zero or an arbitrary allowable value) of a distance between centers of gravity is input from a keyboard or the like. The input data is stored in an allowable-value storing unit 76 via an I/F circuit 71b.

After the initial setting already described, visible lasers are irradiated from the respective visible laser oscillators, reflected lights (spot lights) reflected on the surface of the workpiece are photographed by the CCD camera 6 via the refractive lens 42, the condenser lens 32, the collimate lens 31, and the refractive lens 41, and photographed data is transmitted to the image processing unit 72 via the I/F circuit 71a and subjected to image processing. This processed data is transmitted to the display unit 74 and displayed on a screen, for example, in the form shown in FIG. 3A. On the other hand, the processed data is also transmitted to the calculating unit 73. In this calculating unit 73, center of gravity positions of the respective spot lights are calculated and a distance between centers of gravity thereof is calculated. A calculation result is transmitted to the display unit 74 and displayed on the screen.

Data of the distance between centers of gravity calculated by the calculating unit 73 is transmitted to a judging unit 75. Target value (e.g., zero) data concerning a distance between centers of gravity is transmitted to this judging unit 75 from the allowable-value storing unit 76. This target value and the distance between centers of gravity are distinguished.

As a result of the distinction, when the distance between centers of gravity satisfies the target value, it is specified that a focus position of the processing laser is set on the surface of the workpiece in a present position of the condenser lens. A signal indicating a movement amount: zero (movement is unnecessary) of the condenser lens 32 is transmitted to a movement adjusting unit 78. On the other hand, when the distance between centers of gravity does not satisfy the target value, a signal concerning a movement amount of the condenser lens 32 is transmitted to the movement adjusting unit 78. Such a movement amount signal is transmitted to a not-shown driving unit, which drives the wheel 52b, via an I/F circuit 71c. The visible laser oscillators 51 and 52 and the condenser lens 32 move on the moving rail 8 in synchronization with each other (in the Y direction). For example, the wheel 52b moves a fixed amount according to a fixed movement amount pulse signal transmitted from the movement adjusting unit 78, subsequently, the visible laser oscillators 51 and 52 are turned on again and centers of gravity and a distance between centers of gravity of respective spot lights are calculated, the distance between centers of gravity and the target value are distinguished, and feedback control for stopping, when the target value is satisfied, the driving of the wheel 52b at that point is executed. After the driving of the wheel 52b is stopped, the processing laser oscillator is turned on and shifts to desired laser processing.

Respective operations of the display unit 74, the judging unit 75, the calculating unit 73, the movement adjusting unit 78, and the image processing unit 72 are controlled by a CPU 78 serving as a central control unit. The simultaneous movement of the visible laser oscillators 51 and 52 and the condenser lens 32 may be performed by a feed screw mechanism including an actuator such as a servomotor.

FIG. 6 is a diagram showing an embodiment of a control flow of the laser processing system. FIG. 7 is a graph for explaining a relation between a distance between centers of gravity and a condenser lens position.

First, after the initial setting described above, the CPU 78 turns on one visible laser oscillator (step S200). Subsequently, the CPU 78 calculates a center of gravity position (X1, Y1) of spot light on the surface of a workpiece of this visible laser (step S201). Similarly, the CPU 78 turns on the other visible laser oscillator (step 202) and calculates a center of gravity position (X2, Y2) of spot light on the surface of the workpiece of this visible laser (step S203).

The CPU 78 calculates a distance between centers of gravity: L from the two center of gravity positions (step S204) and judges whether L satisfies the target value, i.e., L=0 or L is within the allowable value range (step S205). When the distance between centers of gravity satisfies the target value, the CPU 78 directly turns on the processing laser oscillator and shifts to laser processing (step S207). On the other hand, when the distance between centers of gravity does not satisfy the target value, the CPU 78 moves the condenser lens by the predetermined amount (step S206), executes steps S200 to S205 again (feedback control), and shifts to laser processing at a stage when the distance between centers of gravity satisfies the target value in step S205 (step S207).

A diagram for explaining step S206 in the flow described above is a graph in FIG. 7. As already described, the distance between centers of gravity: L satisfies an arbitrary linear function (L=kP) corresponding to a condenser lens position: P. Therefore, when a calculated condenser lens position is P and a calculated distance between centers of gravity is L, it is possible to adjust the distance between centers of gravity to zero by moving the condenser lens by the predetermined amount (to a condenser lens position of P0).

FIG. 8 is a diagram showing another embodiment of the control flow of the laser processing system and FIG. 9 is a graph for explaining a relation between a distance between centers of gravity and a condenser lens. First, after the initial setting already described, the CPU 78 turns on one visible laser oscillator (step S300). Subsequently, the CPU 78 calculates a center of gravity position (X1, Y1) of spot light on the surface of a workpiece of this visible laser (step S301). Similarly, the CPU 78 turns on the other visible laser oscillator (step S302) and calculates a center of gravity position (X2, Y2) of spot light on the surface of the workpiece of this visible laser (step S303). The CPU 78 calculates a distance between centers of gravity: L1 and a condenser lens position P1 at the time of the distance between centers of gravity: L1 from the two center of gravity positions (step S304).

Subsequently, after moving the condenser lens 32 by an arbitrary amount (step S305), similarly, the CPU 78 turns on one visible laser oscillator (step S306), calculates a center of gravity position (X1', Y1') of spot light (step S307), turns on the other visible laser oscillator (step S308), calculates a center of gravity position (X2', Y2') of spot light (step S309), and calculates a distance between centers of gravity: L2 and a condenser lens position P2 at the time of the distance between centers of gravity: L2 (step S310).

The CPU 78 specifies, from two points (P1, L1) and (P2, L2), a condenser lens position: P0 where the distance between centers of gravity: L is zero (step S311). A method of specifying the condenser lens position P0 is evident from a graph shown in FIG. 9. Since the distance between centers of gravity: L satisfies the arbitrary linear function (L=kP) corresponding to the condenser lens position: P, if the two points are determined, the condenser lens position: P0 where the distance between centers of gravity is zero can be automatically specified from such two points.

The CPU 78 moves the condenser lens to the condenser lens position: P0 (step S312) and, after that, turns on the processing laser oscillator and shifts to laser processing (step S313).

In both the control flows described above, the two visible laser oscillators are alternately controlled to be turned on and, at a stage when the distance between centers of gravity satisfies the target value, the processing laser oscillator is controlled to be turned on. Consequently, it is easy to specify a center of gravity position and it is possible to realize efficient laser processing.

FIG. 10 is a diagram showing another embodiment of the condensing optical system. In the embodiment, in a condensing optical system 3a shown in the figure, visible lasers irradiated from two visible laser oscillators 53 and 54 are subjected to angle adjustment in return mirrors 33 and 34, respectively. Since the respective visible lasers are subjected to initial angle adjustment by the return mirrors peculiar to the visible lasers, it is possible to make initial setting easier.

FIG. 11 is a schematic diagram showing another embodiment of the laser processing system. This laser processing system 100A is constituted by attaching the housing 9 and the CCD camera 6 to the tip of a multi-joint robot arm 10. With this laser processing system 100A, the housing 9 and the CCD camera 6 are moved to an appropriate laser processing area in a vehicle C shown in the figure by the multi-joint robot arm 10, a positional deviation amount of visible lasers is measured, the condenser lens and the like are moved and adjusted as required, and, then, laser processing by the visible lasers is carried out.

According to the laser processing system 100A, it is possible to cope with expansion of the multi-joint robot arm 10 with the length of the optical fiber 2 and easily perform laser processing in a vehicle area to which a worker cannot access. Therefore, it is possible to provide a system that has a wide application range and high work efficiency. The system is suitable for remote welding.

The embodiments of the present invention have been described in detail using the drawings. However, a specific constitution is not limited to the embodiments. Even if a design change and the like are performed without departing from the spirit of the present invention, the design change and the like are included in the present invention. For example, instead of specifying center of gravity positions of spot lights and calculating a distance between centers of gravity to specify a focus position of a processing laser, a method of creating a correlation graph in advance in order to cause focus positions of two or more visible lasers to coincide with the focus position of the processing laser or cause the focus positions of the visible lasers to accurately coincide with the focus position of the processing laser in a range of an allowable deviation amount and specifying a degree of coincidence of the focus positions of the respective visible lasers on the basis of this correlation graph may be adopted. In this case, adjustment of focus positions is performed while the visible lasers and a condenser lens closest to a workpiece are moved in synchronization with each other as required. Here, in creating a correlation graph, a correlation graph in which a correlation value is 100% when focus positions of two or more visible lasers completely coincide with each other and the correlation value decreases according to a plane deviation amount of both the focus positions is created. In this correlation graph, a correlation value and a deviation amount correspond to each other in such a manner that a correlation value is 95% when both the focus positions deviate from each other 1 mm. When an allowable deviation amount required in processing is 1 mm, the respective visible lasers (and the condenser lens) are adjusted to move forward and backward in a range of the correlation value of 95%. As a method of creating a correlation graph, i.e., a method of calculating a correlation value, it is possible to apply a correlation graph by, for example, publicly-known Correlation Coefficient (CC) and Selective Correlation Coefficient obtained by further expanding the Correlation Coefficient.

It is also possible to adapt the two or more visible laser oscillators to be capable of irradiating visible laser beams having different wavelength. In visually recognizing a degree of coincidence of focus positions of the two or more visible lasers on an image monitor, by applying lasers having different wavelengths to the respective visible lasers, it is possible to more clearly specify the degree of coincidence of the focus positions because hues of focus lights are different. By subjecting the focus lights of the visible lasers having the different hues to photographing/image processing, measuring a positional deviation amount of both the visible lasers on a screen, and reading the positional deviation amount into the created correlation graph, it is possible to more accurately judge whether the positional deviation amount is within the range of the allowable deviation amount. It is also possible to provide an appropriate mask in the visible laser oscillators and form an image, which is obtained by subjecting the focus lights to the image processing, in a shape other than a circular shape. For example, a mask pattern in which a focus position is a cross-shaped intersection is prepared in one visible laser and it is judged whether circular focus light of the other visible laser having a different hue coincides with the cross-shaped intersection.

The invention claimed is:

1. A laser processing system that irradiates a laser beam on a surface of a workpiece to perform laser processing, the laser processing system comprising:
a processing laser oscillator, a condensing optical system including a condenser lens, two or more visible laser oscillators, movement adjusting means for adjusting the condenser lens and the visible laser oscillators to move forward and backward in synchronization with each other, imaging means for imaging spot lights of visible lasers on the surface of the workpiece, and image processing means for subjecting an imaged video to image processing and displaying an image after the processing, both a processing laser and the visible lasers being irradiated on the workpiece via the condenser lens, characterized in that
the laser processing system further includes calculating means for calculating, in a state in which the respective visible lasers are focused on a focus position of the processing laser, center of gravity positions of spot lights of the respective visible lasers formed on the surface of the workpiece according to the movement of the condenser lens and a distance between centers of gravity that is a distance between those center of gravity positions and control means for controlling the movement adjusting means such that the distance between centers of gravity is adjusted to zero or substantially zero.

2. The laser processing system according to claim 1, wherein the two or more visible laser oscillators are controlled to be alternately turned on.

3. The laser processing system according to claim 1 wherein, at a stage when the distance between centers of gravity of the respective spot lights is adjusted to zero or substantially zero, the processing laser oscillator is controlled to be turned on.

4. The laser processing system according to claim 1, wherein an optical fiber that guides a processing laser beam is interposed between the processing laser oscillator and the condensing optical system and the laser processing system further includes a manipulator mounted with a unit including at least the condensing optical system and the imaging means.

5. A laser processing method employing a laser processing system including a processing laser oscillator, a condensing optical system including a condenser lens, first and second visible laser oscillators, movement adjusting means for adjusting the condenser lens and the visible laser oscillators to move forward and backward in synchronization with each other, imaging means for imaging spot lights of visible lasers on the surface of a workpiece, and image processing means for subjecting an imaged video to image processing and displaying an image after the processing, the laser processing system being disposed such that both the processing laser and the visible lasers are irradiated on the workpiece via the condenser lens, the laser processing method characterized by comprising:
a first step of performing adjustment of an irradiation angle of the respective visible lasers and positioning adjustment for the condenser lens and the visible laser oscillators such that the respective visible lasers are focused on a focus position of the processing laser;
a second step of turning on the first visible laser oscillator to image the spot light of the visible laser on the surface of the workpiece and calculating a center of gravity position of the spot light;
a third step of turning on the second visible laser oscillator to image the spot light of the visible laser on the surface of the workpiece and calculating a center of gravity position of the spot light;
a fourth step of calculating a distance between centers of gravity of both the spot lights;
a fifth step of moving the condenser lens and the visible laser oscillators in synchronization with each other such that the distance between centers of gravity is adjusted to zero; and
a sixth step of turning on the processing laser oscillator at a stage when the distance between centers of gravity is adjusted to zero.

* * * * *